(12) United States Patent
Chen et al.

(10) Patent No.: US 12,488,738 B2
(45) Date of Patent: Dec. 2, 2025

(54) LED DRIVING CIRCUIT AND DRIVING METHOD, LED DISPLAY SYSTEM

(71) Applicant: HANGZHOU SHIXIN TECHNOLOGY CO., LTD, Hangzhou (CN)

(72) Inventors: Riyi Chen, Hangzhou (CN); Hong Bao, Hangzhou (CN); Liang Wang, Hangzhou (CN)

(73) Assignee: HANGZHOU SHIXIN TECHNOLOGY CO., LTD, Hangzhou (CN)

( * ) Notice: Subject to any disclaimer, the term of this patent is extended or adjusted under 35 U.S.C. 154(b) by 0 days.

(21) Appl. No.: 18/700,375

(22) PCT Filed: Mar. 25, 2022

(86) PCT No.: PCT/CN2022/083002
§ 371 (c)(1),
(2) Date: Apr. 11, 2024

(87) PCT Pub. No.: WO2023/060845
PCT Pub. Date: Apr. 20, 2023

(65) Prior Publication Data
US 2024/0412683 A1    Dec. 12, 2024

(30) Foreign Application Priority Data
Oct. 11, 2021    (CN) .......................... 202111182998.8

(51) Int. Cl.
*G09G 3/32* (2016.01)

(52) U.S. Cl.
CPC ....... *G09G 3/32* (2013.01); *G09G 2300/0426* (2013.01); *G09G 2300/0861* (2013.01);
(Continued)

(58) Field of Classification Search
CPC ......... G09G 2330/10; G09G 2300/026; G09G 3/32; G09F 9/33; H05B 45/48;
(Continued)

(56) References Cited

U.S. PATENT DOCUMENTS 7,483,003 B2    1/2009  Nogawa
2005/0062685 A1    3/2005  Nogawa

FOREIGN PATENT DOCUMENTS

CN    102510612 A    6/2012
CN    202276524 U  *  6/2012
(Continued)

OTHER PUBLICATIONS

CN-102510612-B (Year: 2014).*
(Continued)

*Primary Examiner* — Sanjiv D. Patel
(74) *Attorney, Agent, or Firm* — Westman, Champlin & Koehler, P.A.

(57) ABSTRACT

Disclosed is an LED driving circuit and a driving method thereof, an LED display system. The LED driving circuit includes a main input terminal, a backup input terminal, and an output terminal. The LED driving circuit receives a configuration signal and a data signal from a preceding LED driving circuit via the main input terminal, or from any of previous LED driving circuits via the backup input terminal. The LED driving circuit forwards the configuration signal and the data signal of the LED driving circuits that are cascaded after the current LED driving circuit to a next LED driving circuit and/or to a following LED driving circuit that is connected to the current LED driving circuit across the next LED driving circuit via the output terminal. The present disclosure can ensure normal operation of following circuits even in case of continuous damage of some circuits.

20 Claims, 5 Drawing Sheets

(52) U.S. Cl.
CPC . *G09G 2310/0272* (2013.01); *G09G 2320/04* (2013.01); *G09G 2320/08* (2013.01)

(58) Field of Classification Search
CPC ........ H05B 45/54; H05B 47/18; H05B 45/46; H05B 47/155; H05B 45/52; H05B 45/58; H05B 47/23; H05B 47/235; H05B 45/00; H05B 45/30
See application file for complete search history.

(56) References Cited

FOREIGN PATENT DOCUMENTS

| CN | 102510612 B | * | 7/2014 |
|---|---|---|---|
| CN | 204929358 U | | 12/2015 |
| CN | 105873290 A | * | 8/2016 |
| CN | 205666048 U | * | 10/2016 |
| CN | 205793511 U | * | 12/2016 |
| CN | 206100545 U | | 4/2017 |
| CN | 109068453 A | | 12/2018 |
| CN | 111698814 A | | 9/2020 |
| CN | 113628581 A | | 11/2021 |
| JP | 2005003699 A | | 1/2005 |

OTHER PUBLICATIONS

CN-202276524-U (Year: 2012).*
CN-105873290-A (Year: 2016).*
CN-205666048-U (Year: 2016).*
CN-205793511-U (Year: 2016).*
International Search Report (including English translation) and Written Opinion for International Application No. PCT/CN2022/083002, dated May 18, 2022, 11 pages.

* cited by examiner

LED DRIVING CIRCUIT AND DRIVING METHOD, LED DISPLAY SYSTEM

CROSS-REFERENCE TO RELATED APPLICATION

This application is a Section 371 National Stage application of International Application No. PCT/CN2022/083002, which was filed on Mar. 25, 2022 and published as WO2023/060845A1, on Apr. 20, 2023, not in English, which claims priority to the Chinese invention application No. 202111182998.8, filed on Oct. 11, 2021, and entitled "LED DRIVING CIRCUIT AND DRIVING METHOD, LED DISPLAY SYSTEM", the contents of which are incorporated herein by reference in their entireties.

TECHNICAL FIELD

The present disclosure relates to the field of LED display technology, and more specifically, to an LED driving circuit and a driving method, and an LED display system.

BACKGROUND

Low-power LED chips are widely used in applications such as outdoor landscape lighting and auxiliary lighting. An LED string and an exterior-wall LED display screen consisting of LED strings according to predetermined rules are used to display various images and text information. The LED string and the LED display system consisting of the LED strings includes a control terminal and an LED display screen. The LED display screen includes a plurality of LED string units, each LED string unit corresponding to a display area of the LED display screen. The LED string unit can be used individually, or a plurality of LED string units can be cascaded into a group to expand a display area of the display screen. Each LED string unit generally consists of an LED driving circuit and several LED lamps. A driving circuit of each LED string unit is responsible for both the task of LED driving and the task of signal reconstruction of a control signal that is forwarded by a driving circuit of a previous LED string unit. Thus, the control information is forwarded from one end of the LED string to the next driving circuit one by one using serial communication, until to a driving circuit of the last LED string unit.

However, when one of the LED string units or a plurality of LED string units arranged in succession in the LED display screen system fails, a signal output terminal of the driving circuit will not output a normal control signal. As a result, the LED lamps, that are controlled by the driving circuit and following driving circuits, cannot light up properly for displaying images.

SUMMARY OF THE DISCLOSURE

In view of the above problems, an objective of the present disclosure is to provide an LED driving circuit, a driving method, and an LED display system, which can still ensure that LED strings that are driven by following stages can still be driven properly in case of failure of continuous driving circuits.

According to a first aspect of the present disclosure, there is provided an LED driving circuit comprising a main input terminal, at least one backup input terminal and an output terminal: wherein the LED driving circuit receives a configuration signal and a data signal from a preceding LED driving circuit via the main input terminal, or from any of previous LED driving circuits via the backup input terminal, with at least one LED driving circuit spaced between the previous LED driving circuits and the current LED driving circuit: the LED driving circuit forwards, via the output terminal, the configuration signal and the data signal of the LED driving circuits that are cascaded after the current LED driving circuit to a next LED driving circuit and/or to a following LED driving circuit that is connected to the current LED driving circuit across the next LED driving circuit, with at least one LED driving circuit spaced between the following LED driving circuit and the current LED driving circuit.

Optionally, the configuration signal includes a configuration instruction and a bridging parameter, the bridging parameter is the number of the LED driving circuits spaced between the current LED driving circuit and the previous LED driving circuits, and the data signal includes a plurality of display data.

Optionally, when the LED driving circuit receives the configuration signal and the data signal from the backup input terminal, a first bridging parameter in the configuration signal is taken as the bridging parameter of the current LED driving circuit; a (k+1)-th data signal in the data signal is taken as the display data of the current LED driving circuit according to the bridging parameter of the current LED driving circuit, where k is the bridging parameter of the current LED driving circuit.

Optionally, when the LED driving circuit receives the configuration signal and the data signal from the backup input terminal, the display data after the (k+1)-th data signal in the data signal are forwarded as a new data signal to the next LED driving circuit and/or the following LED driving circuit that is connected to the current LED driving circuit across the next LED driving circuit; and the configuration instruction and the bridging parameter after the first bridging parameter in the configuration signal are forwarded as a new configuration signal to the next LED driving circuit and/or the following LED driving circuit that is connected to the current LED driving circuit across the next LED driving circuit.

Optionally, when the LED driving circuit receives the configuration signal and the data signal from the main input terminal, the LED driving circuit takes the first display data of the data signal as the display data of the current LED driving circuit.

Optionally, when the LED driving circuit receives the configuration signal and the data signal from the main input terminal, the LED driving circuit forwards the display data after the first display data in the data signal as a new data signal to the next LED driving circuit and/or the following LED driving circuit that is connected to the current LED driving circuit across the next LED driving circuit; and the configuration instruction and the bridging parameter after the first bridging parameter in the configuration signal are forwarded as a new configuration signal to the next LED driving circuit and/or the following LED driving circuit that is connected to the current LED driving circuit across the next LED driving circuit.

Optionally, the main input terminal of the first LED driving circuit is coupled with a control terminal.

Optionally, the main input terminal of any LED driving circuit after the first LED driving circuit is coupled with a preceding LED driving circuit: a backup input terminal that is float, or coupled with an output terminal of any previous LED driving circuit that is connected to the current LED driving circuit across the preceding LED driving circuit; an output terminal that is coupled with a main input terminal of the next LED driving circuit, and coupled with a backup terminal of any following LED driving circuit that is connected to the current LED driving circuit across the next LED driving circuit.

Optionally, the LED driving circuit comprises an input detection unit, a data processing unit, a display memory unit and a driving unit, wherein the input detection unit is used to send the configuration signal and the data signal to the data processing unit when detecting that the configuration signal and the data signal are received from the main input terminal: the data processing unit is used to take the first display data of the data signal as the display data of the current LED driving circuit: the display memory unit is used to cache the display data of the current LED driving circuit: the driving unit is used to generate a driving signal according to the display data of the current LED driving circuit, and the driving signal is used for driving LED strings.

Optionally, the LED driving circuit further comprises a bridging processing unit, the input detection unit is further used to send the configuration signal and the data signal to the bridging processing unit when detecting that the configuration signal and the data signal are received from the backup input terminal: the bridging processing unit is used to take a first bridging parameter in the configuration signal as the bridging parameter of the current LED driving circuit: the data processing unit is further used to take a (k+1)-th data signal in the data signal as the display data of the current LED driving circuit according to the bridging parameter of the current LED driving circuit.

Optionally, the LED driving circuit further comprises: a data forwarding unit for forwarding the configuration signal and the data signal of the LED driving circuits that are cascaded after the current LED driving circuit to a next LED driving circuit and/or to a following LED driving circuit that is connected to the current LED driving circuit across the next LED driving circuit.

Optionally, when the input detection unit detects that the configuration signal and the data signal are received from the backup input terminal, the data forwarding unit forwards the display data after the (k+1)-th data signal in the data signal as a new data signal to the next LED driving circuit and/or the following LED driving circuit that is connected to the current LED driving circuit across the next LED driving circuit; and the configuration instruction and the bridging parameter after the first bridging parameter in the configuration signal are forwarded as a new configuration signal to the next LED driving circuit and/or the following LED driving circuit that is connected to the current LED driving circuit across the next LED driving circuit.

Optionally, when the input detection unit detects that the configuration signal and the data signal are received from the main input terminal, the data forwarding unit forwards the display data after the first display data of the data signal as a new data signal to the next LED driving circuit and/or the following LED driving circuit that is connected to the current LED driving circuit across the next LED driving circuit; and the configuration instruction and the bridging parameter after the first bridging parameter in the configuration signal are forwarded as a new configuration signal to the next LED driving circuit and/or the following LED driving circuit that is connected to the current LED driving circuit across the next LED driving circuit.

According to another aspect of the present disclosure, there is provided an LED display system comprising a control terminal and a plurality of LED string units that are cascaded with each other, each LED string unit comprises an LED driving circuit as described above and an LED string, the LED display system comprising: the control terminal sends a configuration signal and a data signal to the LED string units, wherein the configuration signal includes a configuration instruction and a bridging parameter, and the data signal includes a plurality of display data: when the LED driving circuit in each of the plurality of LED string units receives the configuration signal and the data signal from the backup input terminal, a (k+1)-th data signal in the data signal is taken as the display data of the current LED driving circuit according to the bridging parameter in the configuration signal, wherein k is the bridging parameter of the current LED driving circuit.

Optionally, when the LED driving circuit in each of the plurality of LED string units receives the configuration signal and the data signal from the main input terminal, a first display data, which is first in order, of the data signal is taken as the display data of the current LED driving circuit.

According to a third aspect of the present disclosure, there is provided a driving method of an LED driving circuit, the LED driving circuit comprising a main input terminal, at least one backup input terminal and an output terminal, characterized in that: detecting whether the LED driving circuit receives a configuration signal and a data signal from an input terminal or a backup input terminal, wherein the configuration signal includes a configuration instruction and a bridging parameter, the bridging parameter is a number of the LED driving circuits spaced between the current LED driving circuit and the previous LED driving circuits, and the data signal includes a plurality of display data: when detecting that the configuration signal and data signal are received from the backup input terminal, a first bridging parameter, which is first in order, of the configuration signal is taken as the bridging parameter of the current LED driving circuit; a (k+1)-th data signal in the data signal is taken as the display data of the current LED driving circuit according to the bridging parameter of the current LED driving circuit, where k is the bridging parameter of the current LED driving circuit.

Optionally, the driving method further comprises: forwarding the display data after the (k+1)-th data signal in the data signal as a new data signal to a next LED driving circuit and/or to a following LED driving circuit that is connected to the current LED driving circuit across the next LED driving circuit; and the configuration instruction and the bridging parameter after the first bridging parameter in the configuration signal are forwarded as a new configuration signal to the next LED driving circuit and/or the following LED driving circuit that is connected to the current LED driving circuit across the next LED driving circuit.

Optionally, the driving method further comprises: when detecting that the configuration signal and the data signal are received from the main input terminal, a first display data, which is first in order, of the data signal is used as the display data of the current LED driving circuit.

Optionally, the driving method further comprises: forwarding the display data after the first display data of the data signal as a new data signal to the next LED driving circuit and/or the following LED driving circuit that is connected to the current LED driving circuit across the next LED driving circuit; and forwarding the configuration instruction and the bridging parameter after the first bridging parameter in the configuration signal as a new configuration signal to the next LED driving circuit and/or the following LED driving circuit that is connected to the current LED driving circuit across the next LED driving circuit.

In an LED driver circuit, a driving method thereof, and an LED display system according to embodiments of the present disclosure, when receiving the configuration signal and the data signal from a backup input terminal, a first bridging parameter, which is first in order, of the configuration signal is taken as the bridging parameter of the current LED driving circuit; a (k+1)-th data signal in the data signal is taken as the display data of the current LED driving circuit according to the bridging parameter of the current LED driving circuit, where k is the bridging parameter of the LED driving circuit, so as to ensure normal operation of following circuits even in case of continuous damage of some circuits.

BRIEF DESCRIPTION OF THE DRAWINGS

The foregoing and other objects, features and advantages of the present disclosure will become clearer by the following description of embodiments of the present disclosure with reference to the accompanying drawings.

DETAILED DESCRIPTION

Figure 1:
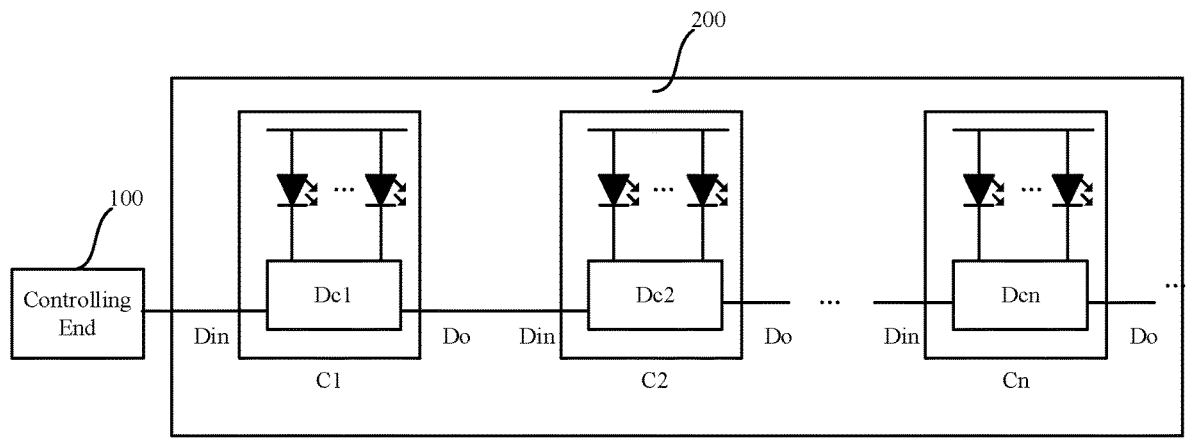
FIG. 1 shows a schematic diagram of an LED display system in the prior art.

Various embodiments of the present disclosure will be described in more detail below with reference to the accompanying drawings. In the various figures, the same elements are denoted by the same or similar reference numerals. For the sake of clarity, various parts in the accompanying drawings are not drawn to scale.

Specific embodiments of the present disclosure will be described in further detail below in conjunction with the accompanying drawings and embodiments.

FIG. 1 shows a schematic diagram of an LED display system in the prior art. The LED display system includes a control terminal 100 and an LED display screen 200, and the control terminal 100 is coupled with the LED display screen 200. The LED display screen 200 includes a plurality of LED string units (C1-Cn) that are cascaded with each other. Each LED string unit includes at least one LED driving circuit and an LED string. A plurality of driving circuits of the plurality of cascaded LED string units are connected in series.

The control terminal 100 provides the data signal to the LED display screen 200, wherein the data signal includes display data of the plurality of cascaded LED string units.

The LED driving circuit in each LED string unit has only one input terminal Din and one output terminal Do. The output terminal Do of each stage of the driving circuit sends data signal to the input terminal Din of the driving circuit of the next stage. When one of the driving circuits in the system fails, the output terminal Do of the driving circuit cannot send data signal to the next LED driving circuit. As a result, the LED lamps, that are controlled by the driving circuit and the following driving circuits, cannot light up properly for displaying images, affecting image display.

Figure 2:
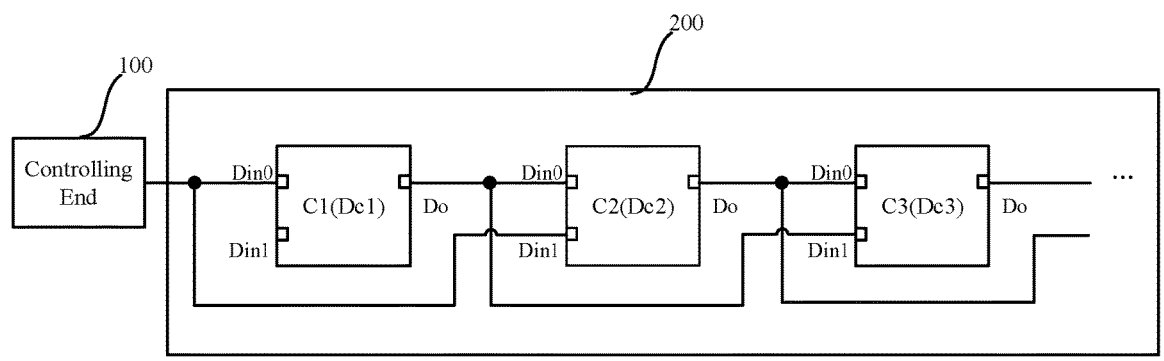
FIG. 2 shows a schematic diagram of another LED display system in the prior art.

FIG. 2 shows a schematic diagram of another LED display system in the prior art. Referring to FIG. 2, the LED driving circuit in each LED string unit includes a main input terminal Din0 and a backup input terminal Din1 as well as an output terminal Do. Here, the main input terminal Din0 is coupled with an output terminal Do of the preceding LED driving circuit: the backup input terminal Din1 is coupled with an output terminal of the previous LED driving circuits. An LED driving circuit is spaced between the previous LED driving circuits and the current LED driving circuit.

The LED display system can effectively avoid the phenomenon that the entire string of LED lamps cannot light up when one LED driving circuit in the LED string fails. However, in practical applications, for an LED string, especially for a display screen consisting of a plurality of LED strings, there may easily occur continuous several LED driving circuits that are prone to failure. For example, at an edge of the screen, there may be continuous failure due to collision during transportation and installation. In this case, the LED display system still cannot light up the following LED lamps that are cascaded in case of several LED driving circuits being damaged continuously, affecting a display effect.

Figure 3:
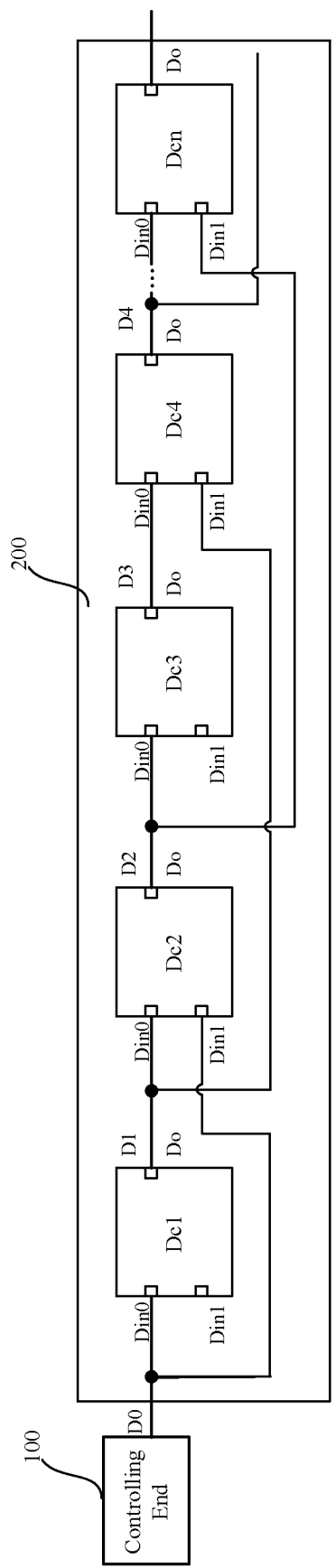
FIG. 3 shows a schematic diagram of structure of an LED display system according to an embodiment of the present disclosure.

FIG. 3 shows a schematic diagram of an LED display system according to an embodiment of the present disclosure. Referring to FIG. 3, the LED driving circuit in each LED string unit includes a main input terminal Din0, a backup input terminal Din1, and an output terminal Do.

A main input terminal of the LED driving circuit is coupled with the preceding LED driving circuit.

In this embodiment, when the LED driving circuit is a first LED driving circuit, its main input terminal Din0 is coupled with the control terminal 100. When the LED driving circuit is one of the following LED driving circuits, its main input terminal Din0 is coupled with the output terminal Do of the preceding LED driving circuit.

A backup input terminal Din1 of each LED driving circuit is coupled with the preceding LED driving circuit, with at least 1 LED driving circuit spaced between the previous LED driving circuits and the current LED driving circuit.

An output terminal Do of each LED driving circuit is coupled with a main input terminal of the next LED driving circuit, and is coupled with a backup input terminal of any following LED driving circuit that is connected to the current LED driving circuit across an LED driving circuit. At least 1 LED driving circuit is spaced between the following LED driving circuits and the current LED driving circuit.

When each LED driving circuit has only one backup input terminal Din1, an output terminal Do of each LED driving circuit provides only one backup signal, and is coupled with a backup input terminal Din1 of one of the LED driver circuits after the LED driving circuit. When bridging occurs, a backup input terminal Din1 of the LED driving circuit is float, or is coupled with any previous LED driving circuit by bridging across an LED driving circuit.

When each LED driving circuit includes m backup input terminals (Din1, Din2, ... Dinm), an output terminal Do of each LED driving circuit can provide q backup signals, wherein m is an integer greater than 1, q is a positive integer, q≤m. The q backup signals are respectively coupled to any one of the m backup input terminals (Din1, Din2, ... ) of the q following LED driving circuits.

The connections of the LED driving circuit shown in FIG. 3 is only one example and is not limited thereto. For example, an output of the control terminal 100 is coupled with a backup input terminal Din1 of the second LED driving circuit Dc2; an output terminal of the first LED driving circuit Dc1 is coupled with a backup input terminal Din1 of the fourth LED driving circuit Dc4, and a backup input terminal Din1 of the third LED driving circuit Dc3 is float.

The LED driving circuit receives a configuration signal and a data signal from the preceding LED driving circuit via the main input terminal Din0, or from any of the previous LED driving circuits via the backup input terminal Din1.

In this embodiment, the configuration signal includes a configuration instruction Ins and bridging parameters (k1+k2+ . . . +ki+ . . . ). The bridging parameters are the number of LED driving circuits that are spaced between the current LED driving circuit and the previous LED driving circuits. The data signal includes a plurality of display data (D0+D1+D2+ . . . +Dn−1+ . . . ). When the bridging parameter ki≥1, ki LED driving circuits are spaced between the current LED driving circuit and the previous LED driving circuits.

When the LED driving circuit receives the configuration signal and the data signal from a backup input terminal Din1, a first bridging parameter in the configuration signal is taken as the bridging parameter of the current LED driving circuit: a (k+1)-th data signal in the data signal is taken as the display data of the current LED driving circuit according to the bridging parameter of the current LED driving circuit, where k is the bridging parameter of the current LED driving circuit. The LED driving circuit forwards the configuration instruction and the bridging parameter after the first bridging parameter in the configuration signal as a new configuration signal to a next LED driving circuit and/or the following LED driving circuit that is connected to the current LED driving circuit across the next LED driving circuit.

For example, when the first LED driving circuit Dc1 fails and a main input terminal Din0 of the second LED driving circuit Dc2 is unable to receive the configuration signal and data signal from the first LED driving circuit Dc1, its backup input terminal Din1 receives the configuration signal and data signal from the control terminal 100, and the first bridging parameter k1 in the configuration signal is taken as the bridging parameter of the second LED driving circuit Dc2, i.e., k1=1. According to the bridging parameter k1, a second data signal D1 in the data signal is taken as the display data of the second LED driving circuit Dc2. The second LED driving circuit Dc2 removes the first bridging parameter k1 in the configuration signal to obtain a new configuration signal, and forwards it to the next LED driving circuit and/or the following LED driving circuit that is connected to the current LED driving circuit across the next LED driving circuit.

When the first LED driving circuit Dc1 operates normally, the first LED driving circuit takes the first display data D0 as the display data of the current LED driving circuit.

The LED driving circuit forwards the configuration signal and the data signal of the LED driving circuits that are cascaded after the current LED driving circuit to the next LED driving circuit and/or the following LED driving circuit that is connected to the current LED driving circuit across the next LED driving circuit via the output terminal Do.

In this embodiment, when the LED driving circuit receives the configuration signal and the data signal from the main input terminal Din0, the LED driving circuit forwards the display data after the first display data of the data signal as a new data signal to the next LED driving circuit and/or the following LED driving circuit that is connected to the current LED driving circuit across the next LED driving circuit; and forwards the configuration instruction and the bridging parameters after the first bridging parameter in the configuration signal as a new configuration signal to the next LED driving circuit and/or the following LED driving circuit that is connected to the current LED driving circuit across the next LED driving circuit.

When the LED driving circuit receives the configuration signal and the data signal from the backup input terminal Din1, the display data after the (k+1)-th data signal in the data signal are forwarded as a new data signal to the next LED driving circuit and/or the following LED driving circuit that is connected to the current LED driving circuit across the next LED driving circuit; and the configuration instruction and the bridging parameters after the first bridging parameter in the configuration signal are forwarded as a new configuration signal to the next LED driving circuit and/or the following LED driving circuit that is connected to the current LED driving circuit across the next LED driving circuit, wherein k is the bridging parameter of the current LED driving circuit.

Figure 4:
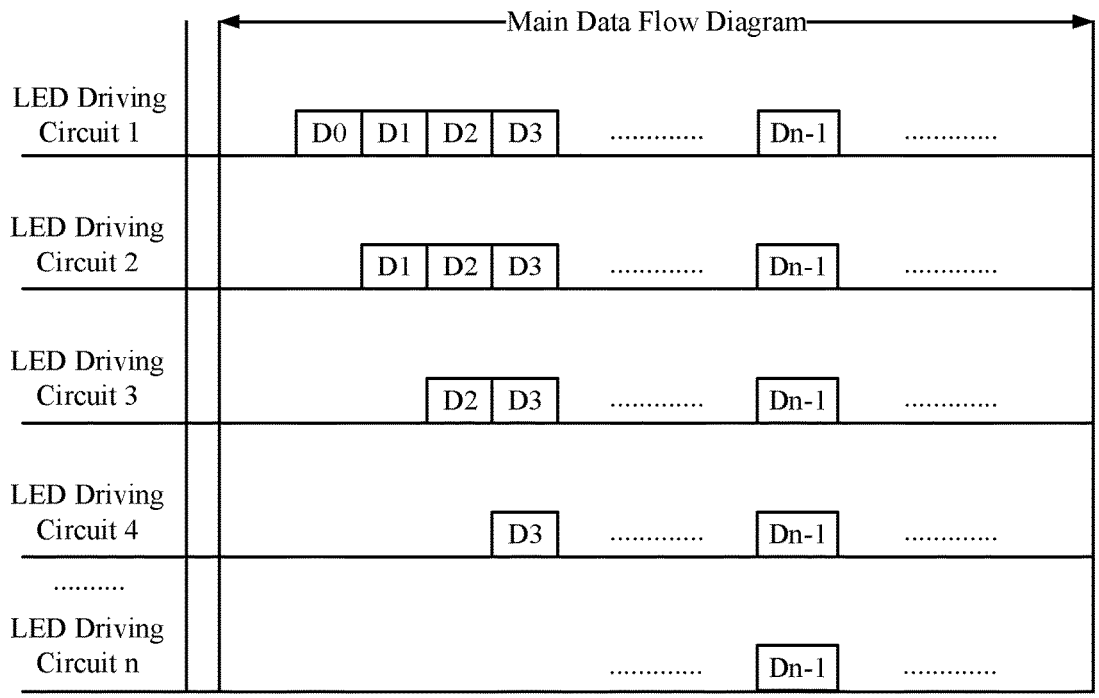
FIG. 4 shows a schematic diagram of a driving data process in a driving control method of an LED string according to an embodiment of the present disclosure.

Referring to FIG. 4, when each LED driving circuit can operate normally, D0 is the display data of the LED driving circuit Dc1: D1 is the display data of the LED driving circuit Dc2: D2 is the display data of the LED driving circuit Dc3, and Dn−1 is the display data of the LED driving circuit Dcn. The current LED driving circuit generates a driving signal according to the display data of the current LED driving circuit; and forwards display data after the display data to the next LED driving circuit.

Figure 5:
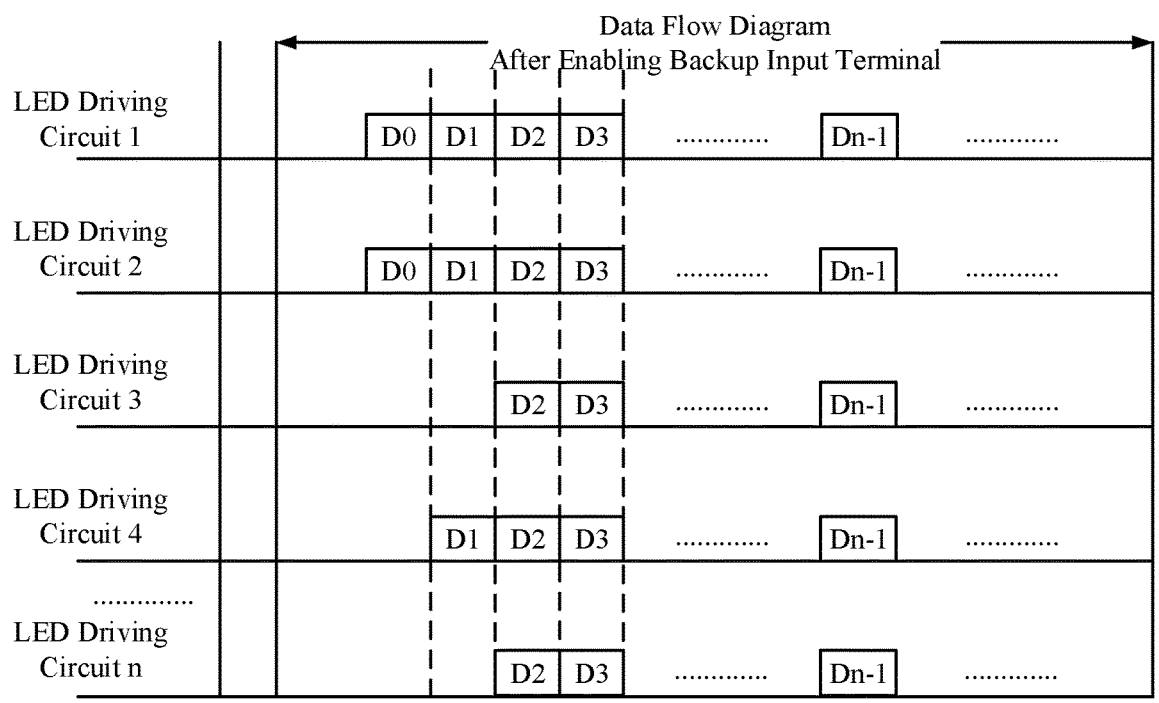
FIG. 5 shows a schematic diagram of another driving data process in a driving control method of an LED string according to an embodiment of the present disclosure.

Referring to FIG. 5, the LED driving circuit Dc1 receives all of the display data from a control terminal, and normally takes the first display data D0 as the display data of the current LED driving circuit: the LED driving circuit Dc2 receives all of the display data from the control terminal via a backup input terminal, and takes the second display data D1 as the display data of the current LED driving circuit according to the bridging parameter k1=1: the LED driving circuit Dc3 has a float backup input terminal Din1, and receives the configuration signal and data signal from the LED driving circuit Dc2 via a main input terminal Din0, and takes the first display data D2 at this time as the display data of the current LED driving circuit. When the LED driving circuit Dc4 receives the configuration signal and data signal from the LED driving circuit Dc1 via a backup input terminal Din1, the third data signal D3 in the data signal is taken as the display data of the current LED driving circuit according to the bridging parameter k2=2.

In the LED display system according to the embodiment of the present disclosure, when receiving the configuration signal and the data signal from the backup input terminal, the first bridging parameter in the configuration signal is taken as the bridging parameter of the current LED driving circuit: a (k+1)-th data signal in the data signal is taken as the display data of the LED driving circuit according to the bridging parameter of the current LED driving circuit, where k is the bridging parameter of the LED driving circuit, so as to ensure normal operation of following circuits even in case of continuous damage of some circuits.

Figure 6:
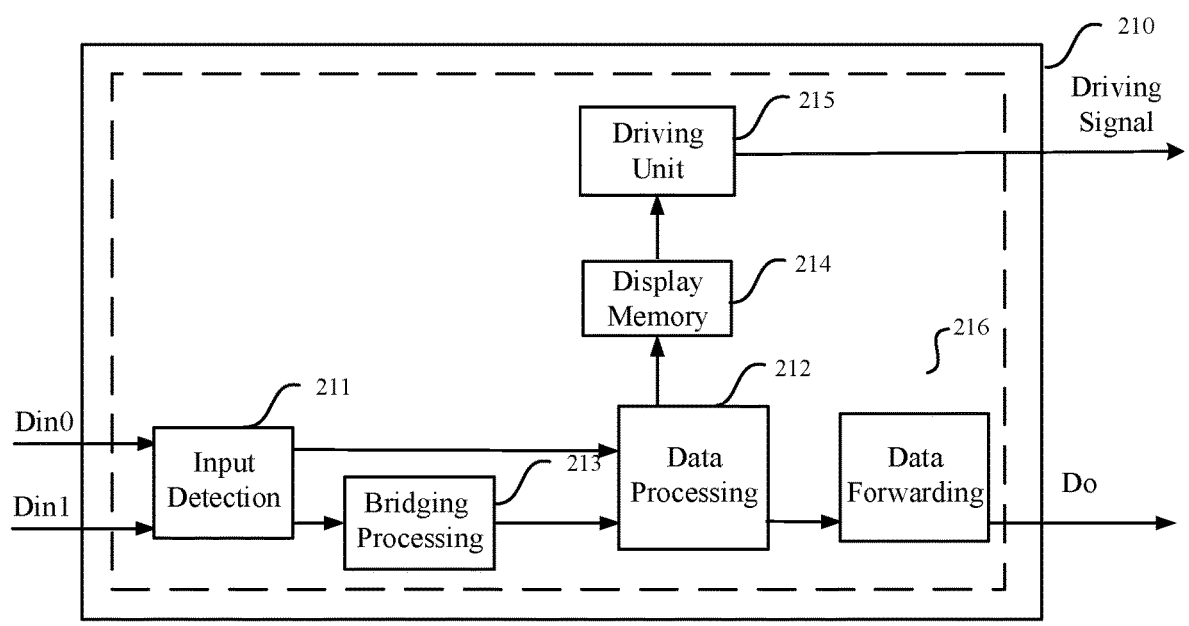
FIG. 6 shows a schematic diagram of structure of an LED driving circuit according to an embodiment of the present disclosure.

FIG. 6 shows a schematic diagram of structure of an LED driving circuit according to an embodiment of the present disclosure. As shown in FIG. 6, the LED driving circuit 210 includes a main input terminal Din0, a backup input terminal Din1 and an output terminal Do, and an input detection unit

211, a data processing unit 212, a bridging processing unit 213, a display memory unit 214, a driving unit 215 and a data forwarding unit 216.

Here, the input detection unit 211 is used to send the configuration signal and the data signal to the data processing unit 212 when detecting that the configuration signal and the data signal are received from the main input terminal Din0. The data processing unit 212 is used to take the first display data of the data signal as display data of the current LED driving circuit. The display memory unit 213 is used to cache the display data of the current LED driving circuit. The driving unit 214 is used to generate a driving signal according to the display data of the current LED driving circuit, and the driving signal is used to drive the LED string.

In this embodiment, the configuration signal includes a configuration instruction Ins and bridging parameters (k1+ k2+ . . . +ki+ . . . ). The bridging parameters are the number of LED driving circuits that are spaced between the current LED driving circuit and the previous LED driving circuits. The data signal includes a plurality of display data (D0+ D1+D2+ . . . +Dn−1+ . . . ). When the bridging parameter ki≥1, ki LED driving circuits are spaced between the current LED driving circuit and the previous LED driving circuits.

The input detection unit 211 is also used to send the configuration signal and the data signal to the data processing unit 212 and the bridging processing unit 213 when detecting that the configuration signal and the data signal are received from the backup input terminal. The bridging processing unit 213 is used to take the first bridging parameter in the configuration signal as the bridging parameter of the current LED driving circuit. The data processing unit 212 is used to take the (k+1)-th data signal in the data signal as the display data of the current LED driving circuit according to the bridging parameter of the current LED driving circuit.

The data forwarding unit 216 is used to forward the configuration signal and data signal of the LED driving circuits that are cascaded after the current LED driving circuit to the next LED driving circuit and/or the following LED driving circuit that is connected to the current LED driving circuit across the next LED driving circuit.

Specifically, when receiving the configuration signal and the data signal from the main input terminal Din0, the data forwarding unit 216 forwards the display data after the first display data of the data signal as a new data signal to the next LED driving circuit and/or the following LED driving circuit that is connected to the current LED driving circuit across the next LED driving circuit; and forwards the configuration instruction and the bridging parameters after the first bridging parameter in the configuration signal as a new configuration signal to the next LED driving circuit and/or the following LED driving circuit that is connected to the current LED driving circuit across the next LED driving circuit.

When receiving the configuration signal and the data signal from the backup input terminal Din1, the data forwarding unit 216 forwards the display data after the (k+1)-th data signal in the data signal as a new data signal to the next LED driving circuit and/or the following LED driving circuit that is connected to the current LED driving circuit across the next LED driving circuit; and forwards the configuration instruction and the bridging parameters after the first bridging parameter in the configuration signal as a new configuration signal to the next LED driving circuit and/or the following LED driving circuit that is connected to the current LED driving circuit across the next LED driving circuit, wherein k is the bridging parameter of the current LED driving circuit.

The LED driving circuit according to the embodiment of the present disclosure, when receiving the configuration signal and the data signal from the backup input terminal, takes the first bridging parameter in the configuration signal as the bridging parameter of the current LED driving circuit; and takes a (k+1)-th data signal in the data signal as the display data of the LED driving circuit according to the bridging parameter of the current LED driving circuit, where k is the bridging parameter of the LED driving circuit, so as to ensure normal operation of following circuits even in case of continuous damage of some circuits.

Figure 7:
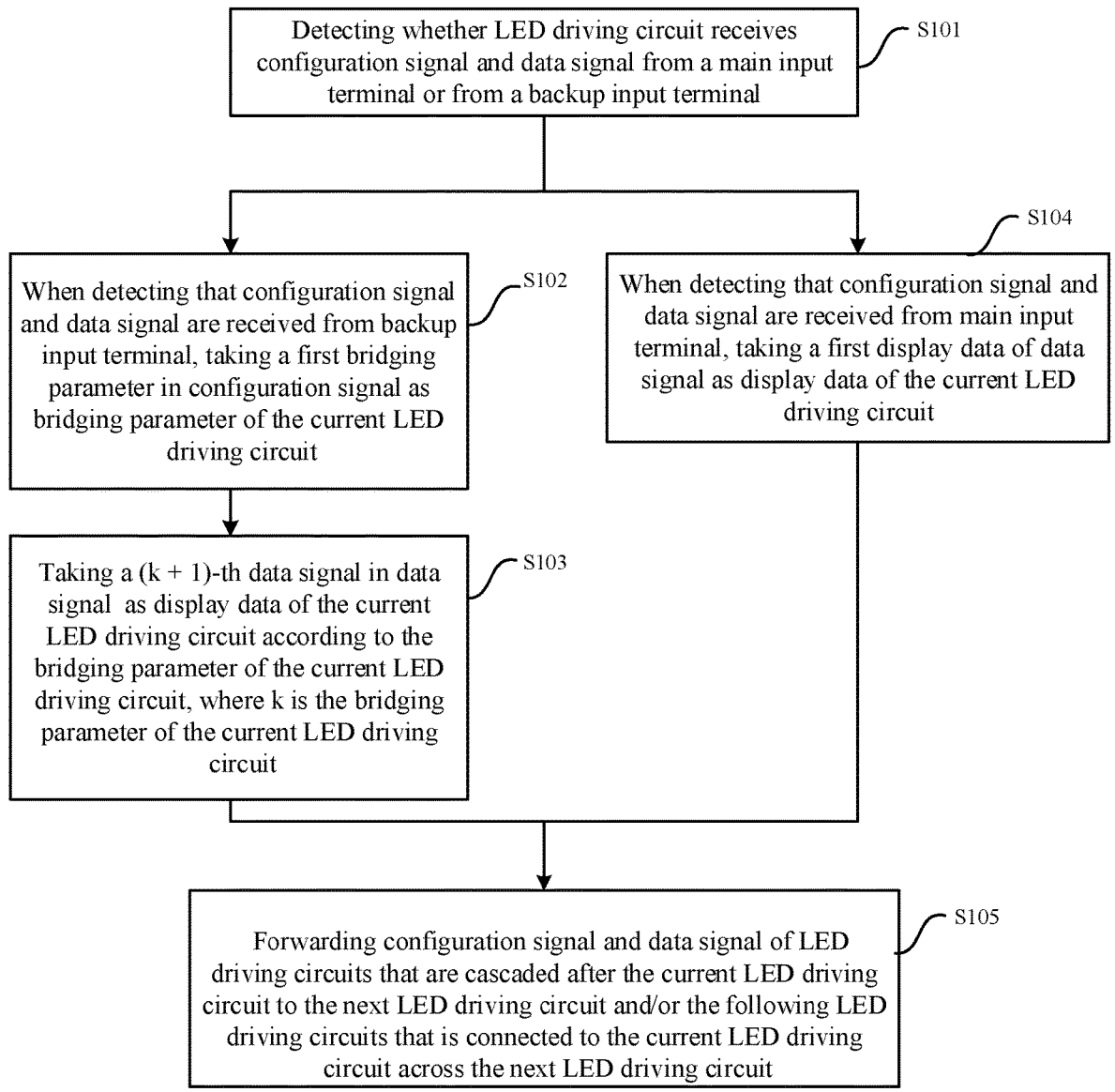
FIG. 7 shows a flow diagram of a driving method of an LED driving circuit according to an embodiment of the present disclosure.

FIG. 7 shows a flow diagram of a driving method of an LED driving circuit according to an embodiment of the present disclosure. Referring to FIG. 7, the driving method comprises the following steps.

In step S101, it is detected whether the LED driving circuit receives the configuration signal and the data signal from a main input terminal or from a backup input terminal.

In this embodiment, the configuration signal includes a configuration instruction Ins and bridging parameters (k1+ k2+ . . . +ki+ . . . ). The bridging parameters are the number of LED driving circuits that are spaced between the current LED driving circuit and the previous LED driving circuits. The data signal includes a plurality of display data (D0+ D1+D2+ . . . +Dn−1+ . . . ). When the bridging parameter ki≥1, ki LED driving circuits are spaced between the current LED driving circuit and the previous LED driving circuits.

When it is detected that the configuration signal and the data signal are received from the backup input terminal, the steps S102-S104 are performed. When it is detected that the configuration signal and the data signal are received from the main input terminal, the step S105 is performed.

In step S102, a first bridging parameter in the configuration signal is taken as the bridging parameter of the current LED driving circuit.

In step S103, a (k+1)-th data signal in the data signal is taken as the display data of the current LED driving circuit according to the bridging parameter of the current LED driving circuit, where k is the bridging parameter of the current LED driving circuit.

Specifically, when the first LED driving circuit Dc1 fails and the main input terminal Din0 of the second LED driving circuit Dc2 is unable to receive the configuration signal and data signal from the first LED driving circuit Dc1, its backup input terminal Din1 receives the configuration signal and data signal from the control terminal 100, and a first bridging parameter k1 in the configuration signal is taken as the bridging parameter of the second LED driving circuit Dc2, i.e. k1=1. According to the bridging parameter k1, a second data signal D1 in the data signal is taken as the display data of the second LED driving circuit Dc2.

In step S104, when it is detected that the configuration signal and the data signal are received from the main input terminal, a first display data of the data signal is taken as the display data of the current LED driving circuit.

Specifically, when the first LED driving circuit Dc1 operates normally, the first LED driving circuit takes the first display data D0 as the display data of the current LED driving circuit.

In step S105, the configuration signal and data signal of the LED driving circuits that are cascaded after the current LED driving circuit are forwarded to the next LED driving circuit and/or the following LED driving circuit that is connected to the current LED driving circuit across the next LED driving circuit.

Specifically, when receiving the configuration signal and the data signal from the main input terminal Din0, the data forwarding unit 216 forwards the display data after the first display data of the data signal as a new data signal to the next LED driving circuit and/or the following LED driving circuit that is connected to the current LED driving circuit across the next LED driving circuit; and forwards the configuration instruction and the bridging parameters after the first bridging parameter in the configuration signal as a new configuration signal to the next LED driving circuit and/or the following LED driving circuit that is connected to the current LED driving circuit across the next LED driving circuit.

When receiving the configuration signal and the data signal from the backup input terminal Din1, the data forwarding unit 216 forwards the display data after the (k+1)-th data signal in the data signal as a new data signal to the next LED driving circuit and/or the following LED driving circuit that is connected to the current LED driving circuit across the next LED driving circuit; and forwards the configuration instruction and the bridging parameters after the first bridging parameter in the configuration signal as a new configuration signal to the next LED driving circuit and/or the following LED driving circuit that is connected to the current LED driving circuit across the next LED driving circuit, wherein k is the bridging parameter of the current LED driving circuit.

The driving method of the LED driving circuit according to the embodiment of the present disclosure, when receiving the configuration signal and the data signal from the backup input terminal, the first bridging parameter in the configuration signal is taken as the bridging parameter of the current LED driving circuit; and a (k+1)-th data signal in the data signal is taken as the display data of the LED driving circuit according to the bridging parameter of the current LED driving circuit, where k is the bridging parameter of the LED driving circuit, so as to ensure normal operation of following circuits even in case of continuous damage of some circuits.

In accordance with the embodiments of the present disclosure, such as described above, these embodiments do not describe all the details in detail, nor do they limit the invention to the specific embodiments described. Obviously, a lot of modifications and changes can be made based on the above description. These embodiments are selected and specifically described in this specification in order to better explain the principles and practical applications of the present disclosure, so that those skilled in the art can make good use of the present disclosure and its modifications on the basis of the present disclosure. The present disclosure is limited only by the claims and their full scope and equivalents.

What is claimed is:

1. An LED driving circuit, comprising: a main input terminal, at least one backup input terminal and an output terminal;
wherein the LED driving circuit receives a configuration signal and a data signal from a preceding LED driving circuit via the main input terminal, or from any of previous LED driving circuits via the backup input terminal, with at least one LED driving circuit spaced between the previous LED driving circuits and the current LED driving circuit;
the LED driving circuit forwards the configuration signal and the data signal of LED driving circuits that are cascaded after the current LED driving circuit to a next LED driving circuit and/or to a following LED driving circuit that is connected to the current LED driving circuit across the next LED driving circuit via the output terminal, with at least one LED driving circuit spaced between the following LED driving circuit and the current LED driving circuit,
wherein when the LED driving circuit receives the configuration signal and the data signal from the backup input terminal, a display data of the LED driving circuit is selected from a plurality of display data included in the data signal received from the backup input terminal according to the configuration signal received from the backup input terminal.

2. The LED driving circuit according to claim 1, wherein the configuration signal includes a configuration instruction and a bridging parameter, the bridging parameter is a number of the at least one LED driving circuit spaced between the current LED driving circuit and the previous LED driving circuits, and the data signal includes a plurality of display data.

3. The LED driving circuit according to claim 2, wherein when the LED driving circuit receives the configuration signal and the data signal from the backup input terminal, a first bridging parameter, which is first in order, of the configuration signal is taken as the bridging parameter of the current LED driving circuit; a (k+1)-th data signal in the data signal is taken as the display data of the current LED driving circuit according to the bridging parameter of the current LED driving circuit, where k is the bridging parameter of the current LED driving circuit.

4. The LED driving circuit according to claim 2, wherein when the LED driving circuit receives the configuration signal and the data signal from the backup input terminal, the display data after the (k+1)-th data signal in the data signal are forwarded as a new data signal to the next LED driving circuit and/or the following LED driving circuit that is connected to the current LED driving circuit across the next LED driving circuit; and the configuration instruction and the bridging parameter after a first bridging parameter, which is first in order, of the configuration signal are forwarded as a new configuration signal to the next LED driving circuit and/or the following LED driving circuit that is connected to the current LED driving circuit across the next LED driving circuit.

5. The LED driving circuit according to claim 2, wherein when the LED driving circuit receives the configuration signal and the data signal from the main input terminal, the LED driving circuit takes a first display data, which is first in order, of the data signal as the display data of the current LED driving circuit.

6. The LED driving circuit according to claim 2, wherein when the LED driving circuit receives the configuration signal and the data signal from the main input terminal, the LED driving circuit forwards the display data after a first display data, which is first in order, of the data signal as a new data signal to the next LED driving circuit and/or the following LED driving circuit that is connected to the current LED driving circuit across the next LED driving circuit; and the configuration instruction and the bridging parameter after a first bridging parameter, which is first in order, of the configuration signal are forwarded as a new configuration signal to the next LED driving circuit and/or the following LED driving circuit that is connected to the current LED driving circuit across the next LED driving circuit.

7. The LED driving circuit according to claim 1, wherein the main input terminal of a first LED driving circuit is coupled with a control terminal.

8. The LED driving circuit according to claim 7, wherein the main input terminal of any LED driving circuit after the first LED driving circuit is coupled with a preceding LED driving circuit;
a backup input terminal that is float, or coupled with an output terminal of any previous LED driving circuit that is connected to the current LED driving circuit across the preceding LED driving circuit;
an output terminal that is coupled with a main input terminal of the next LED driving circuit, and coupled with a backup terminal of any following LED driving circuit that is connected to the current LED driving circuit across the next LED driving circuit.

9. The LED driving circuit according to claim 1, wherein the LED driving circuit comprises an input detection unit, a data processing unit, a display memory unit and a driving unit,
wherein the input detection unit is used to send the configuration signal and the data signal to the data processing unit when detecting that the configuration signal and the data signal are received from the main input terminal;
the data processing unit is used to take a first display data, which is first in order, of the data signal as the display data of the current LED driving circuit;
the display memory unit is used to cache the display data of the current LED driving circuit;
the driving unit is used to generate a driving signal according to the display data of the current LED driving circuit, and the driving signal is used for driving LED strings.

10. The LED driving circuit according to claim 9, wherein the LED driving circuit further comprises a bridging processing unit,
the input detection unit is further used to send the configuration signal and the data signal to the bridging processing unit when detecting that the configuration signal and the data signal are received from the backup input terminal;
the bridging processing unit is used to take a first bridging parameter, which is first in order, of the configuration signal as the bridging parameter of the current LED driving circuit;
the data processing unit is further used to take a (k+1)-th data signal in the data signal as the display data of the current LED driving circuit according to the bridging parameter of the current LED driving circuit.

11. The LED driving circuit according to claim 10, further comprising:
a data forwarding unit for forwarding the configuration signal and the data signal of the LED driving circuits that are cascaded after the current LED driving circuit to a next LED driving circuit and/or to a following LED driving circuit that is connected to the current LED driving circuit across the next LED driving circuit.

12. The LED driving circuit according to claim 11, wherein when the input detection unit detects that the configuration signal and the data signal are received from the backup input terminal, the data forwarding unit forwards the display data after the (k+1)-th data signal in the data signal as a new data signal to the next LED driving circuit and/or the following LED driving circuit that is connected to the current LED driving circuit across the next LED driving circuit;
and the configuration instruction and the bridging parameter after the first bridging parameter in the configuration signal are forwarded as a new configuration signal to the next LED driving circuit and/or the following LED driving circuit that is connected to the current LED driving circuit across the next LED driving circuit.

13. The LED driving circuit according to claim 11, wherein when the input detection unit detects that the configuration signal and the data signal are received from the main input terminal, the data forwarding unit forwards the display data after the first display data of the data signal as a new data signal to the next LED driving circuit and/or the following LED driving circuit that is connected to the current LED driving circuit across the next LED driving circuit;
and the configuration instruction and the bridging parameter after the first bridging parameter in the configuration signal are forwarded as a new configuration signal to the next LED driving circuit and/or the following LED driving circuit that is connected to the current LED driving circuit across the next LED driving circuit.

14. An LED display system, comprising a control terminal and a plurality of LED string units that are cascaded with each other, each LED string unit comprises an LED driving circuit according to claim 1 and an LED string,
the control terminal sends a configuration signal and a data signal to the LED string units, wherein the configuration signal includes a configuration instruction and bridging parameter, and the data signal includes a plurality of display data;
when the LED driving circuit in each of the plurality of LED string units receives the configuration signal and the data signal from the backup input terminal, a (k+1)-th data signal in the data signal is taken as the display data of the current LED driving circuit according to the bridging parameter in the configuration signal, wherein k is the bridging parameter of the current LED driving circuit.

15. The LED display system according to claim 14, wherein when the LED driving circuit in each of the plurality of LED string units receives the configuration signal and the data signal from the main input terminal, a first display data, which is first in order, of the data signal is taken as the display data of the current LED driving circuit.

16. A driving method of an LED driving circuit, the LED driving circuit comprising a main input terminal, at least one backup input terminal and an output terminal, wherein the driving method comprises:
detecting whether the LED driving circuit receives a configuration signal and a data signal from an input terminal or a backup input terminal, wherein the configuration signal includes a configuration instruction and a bridging parameter, the bridging parameter is a number of the LED driving circuits spaced between the current LED driving circuit and the previous LED driving circuits, and the data signal includes a plurality of display data;
when detecting that the configuration signal and data signal are received from the backup input terminal, a first bridging parameter, which is first in order, of the configuration signal is taken as the bridging parameter of the current LED driving circuit;
a (k+1)-th data signal in the data signal is taken as the display data of the current LED driving circuit according to the bridging parameter of the current LED driving circuit, where k is the bridging parameter of the current LED driving circuit.

17. The driving method according to claim 16, further comprising:

forwarding the display data after the (k+1)-th data signal in the data signal as a new data signal to a next LED driving circuit and/or to a following LED driving circuit that is connected to the current LED driving circuit across the next LED driving circuit; and forwarding the configuration instruction and the bridging parameter after the first bridging parameter in the configuration signal as a new configuration signal to the next LED driving circuit and/or the following LED driving circuit that is connected to the current LED driving circuit across the next LED driving circuit.

18. The driving method according to claim 16, further comprising:

when detecting that the configuration signal and the data signal are received from the main input terminal, a first display data, which is first in order, of the data signal is used as the display data of the current LED driving circuit.

19. The driving method according to claim 18, further comprising:

forwarding the display data after the first display data of the data signal as a new data signal to the next LED driving circuit and/or the following LED driving circuit that is connected to the current LED driving circuit across the next LED driving circuit; and forwarding the configuration instruction and the bridging parameter after the first bridging parameter in the configuration signal as a new configuration signal to the next LED driving circuit and/or the following LED driving circuit that is connected to the current LED driving circuit across the next LED driving circuit.

20. An LED driving circuit, comprising: a main input terminal, at least one backup input terminal and an output terminal;

wherein the LED driving circuit receives a configuration signal and a data signal from a preceding LED driving circuit via the main input terminal, or from any of previous LED driving circuits via the backup input terminal, with at least one LED driving circuit spaced between the previous LED driving circuits and the current LED driving circuit;

the LED driving circuit forwards the configuration signal and the data signal of LED driving circuits that are cascaded after the current LED driving circuit to a next LED driving circuit and/or to a following LED driving circuit that is connected to the current LED driving circuit across the next LED driving circuit via the output terminal, with at least one LED driving circuit spaced between the following LED driving circuit and the current LED driving circuit, wherein the configuration signal includes a configuration instruction and bridging parameter, and the data signal includes a plurality of display data;

when the LED driving circuit receives the configuration signal and the data signal from the backup input terminal, a (k+1)-th data signal in the data signal is taken as the display data of the current LED driving circuit according to the bridging parameter in the configuration signal, wherein k is the bridging parameter of the current LED driving circuit.

\* \* \* \* \*